United States Patent Office 3,452,117
Patented June 24, 1969

3,452,117
ORGANIC POLYMERS FROM α-METHYLENE
GLUTARAMIDE
Norman G. Gaylord, New Providence, N.J., assignor to
National Distillers and Chemical Corporation, New
York, N.Y., a corporation of Virginia
No Drawing. Filed May 3, 1967, Ser. No. 635,678
Int. Cl. C08f 3/900, 29/00; C08g 45/04
U.S. Cl. 260—836                                6 Claims

ABSTRACT OF THE DISCLOSURE

This invention relates to novel organic polymers, useful in the surface coating arts, comprised of a plurality of chemical units of the formula:

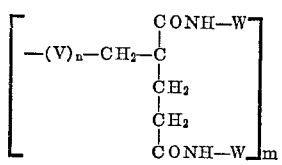

wherein $n$ is an integer less than 75; $m$ is an integer less than 50; W is hydrogen or R''—O—R', wherein R'' is lower alkylene, and R' is lower alkyl; and V is

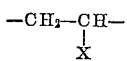

wherein X is aryl or COOR''', where R''' is hydrogen, lower alkyl or halogen.

---

This invention relates to novel organic polymers and to their method of preparation. More particularly, this invention pertains to novel organic polymers prepared from certain diamides and which possess highly desirable properties.

The polymers of this invention are in general prepared by a process which comprises the use of α-methyleneglutaronitrile as the starting material. The α-methyleneglutaronitrile starting material is first subject to controlled intermediate hydrolysis, e.g., by treatment with a mineral acid, for example, sulfuric acid, to yield the intermediate hydrolysis product, α-methyleneglutaramide having the formula:

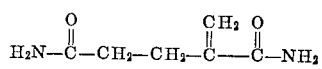

This hydrolysis product, α-methyleneglutaramide, is then copolymerized with one or more organic monomers, such as acrylic or vinyl monomers having the formula:

wherein R is a lower alkylene group and X is an aryl group (e.g., phenyl, tolyl, or xylyl); COOZ, wherein Z is hydrogen, a lower alkyl (e.g. methyl, ethyl, propyl, and the like), or halogen, (e.g. chlorine). Illustrative organic monomers which may be employed include acrylic or vinyl monomers such as styrene, alkyl, acrylate, (e.g., ethyl acrylate) methylmethacrylate, acrylonitrile, vinyl chloride and the like.

Although the amounts of the reactants employed in the copolymerization procedure may vary in accordance with the properties desired in the polymeric products of this invention, particularly outstanding results have been obtained when the α-methyleneglutaramide starting material is reacted with the desired copolymerizing acrylic or vinyl monomers in an amount of from about 3.0 to 20.0 weight percent. Preferably, the α-methyleneglutaramide is present in the amount of from about 8.0 to 26.0 weight percent. The products obtained from the copolymerization procedure of this invention, may be characterized as copolymers containing reactive amide groups and consisting of a plurality of repeating chemical groups corresponding to the Formula I:

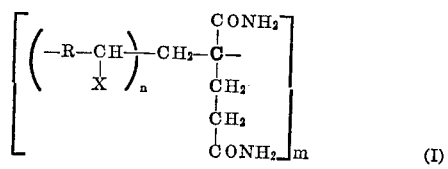 (I)

wherein R and X are each as above defined; $n$ is a positive integer greater than zero and equal to the number of copolymerizing monomers employed in the copolymerization procedure, and generally an integer not in excess of 75; and $m$ is a positive integer greater than zero and of a magnitude sufficient to provide a copolymer of a molecular weight of at least 1000, and generally an integer not in excess of 50.

The copolymers of Formula I, may then be further treated to provide additional novel products of this invention. For example, these may be alkoxyalkylolated as by treatment with an alcohol in the presence of an aldehyde, to yield a highly reactive alkoxyalkylolated copolymer resin. Suitable alcohols include those having the formula R'OH, wherein R' represents an alkyl group, straight or branch chained (e.g., methyl, ethyl, propyl, butyl, amyl, and the like.) Preferred alcohols are n-butanol, ethanol, amyl alcohol, octyl alcohol, and the like. The aldehydes which may be employed have the formula, R''CHO, wherein R'' represents hydrogen, an alkyl group, an aralkyl group, or an aryl group. The preferred aldehydes include formaldehyde, acetaldehyde, propionaldehyde, butyraldehyde, and the like.

It has been found advantageous to employ alcohols, wherein R' is lower alkyl, e.g., butyl, and wherein the aldehyde is formaldehyde, although the other alcohols and aldehydes also give satisfactory results. The alkoxyalkylolation of the copolymers of Formula I yield highly reactive polymer resins possessing a plurality of repeating chemical groups characterized by the Formula II:

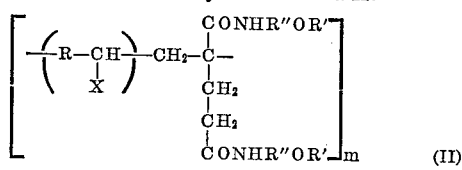 (II)

wherein R, X, $n$, and $m$ are defined above; R'' is lower alkylene (e.g. methylene), and aralkylene; R' is a lower alkyl.

The novel polymers of the Formula II may be further treated by a variety of subsequent methods to yield various products having important polymeric properties. For example, the novel alkylolated polymers can be employed to yield products useful as thermosetting surface coating resins. More specifically, the novel alkoxylakylolated resins of Formula II may be crosslinked or thermoset by known methods and techniques to obtain useful surface coating products.

The novel resins of Formula II, for example, may be thermally crosslinked or homopolymerized according to conventional procedures to yield crosslinked polymeric reins which are characterized as comprising a plurality of repeating units having the following Formula III, wherein R, X, n, m, R' and R'' are as hereinbefore defined.

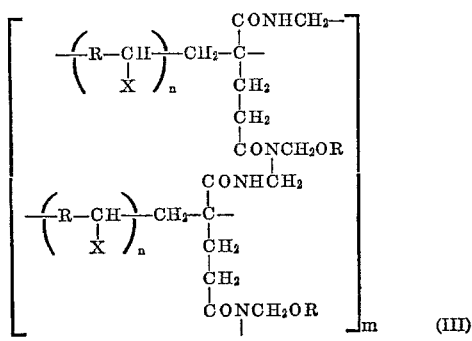 (III)

Alternatively, the novel alkoxyalkylolated polymers of Formula II may be crosslinked by treatment with resins containing reactive carboxyl groups, of the formula,

to yield novel crosslinked polymer resins as represented by the following Formula IV; wherein R, R', R'', X, n, and m are as above defined.

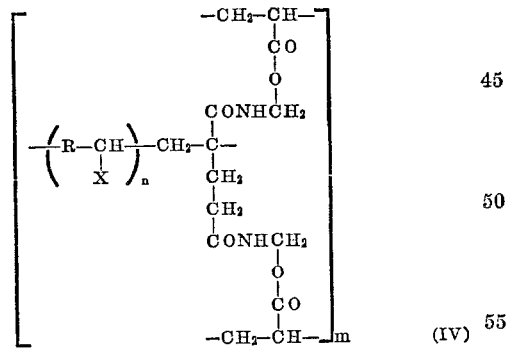 (IV)

The resins containing reactive carboxyl groups which may be employed for this purpose include such resins as alkyd resin, acrylic acid copolymer resin, vinyl chloride-maleic anhydride copolymer resin, and polyester resin. It should also be understood, that the crosslinked polymer resins represented by Formula IV can be subsequently treated, e.g., by further curing reactions, to obtain even more highly crosslinked structures.

The novel alkoxyalkylolated polymer resins of Formula II may be crosslinked by reaction with resins containing reactive hydroxyl groups of the formula;

to yield highly crosslinked polymeric resins characterized by a plurality of repeating units of the Formula V, wherein R, X, R', R'', n, and m are as above defined and Y is a lower alkyl group:

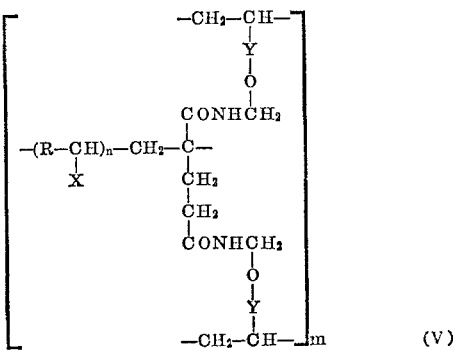 (V)

Resins possessing reactive hydroxyl groups may be employed in the practice of this invention and include such resins as alkyd resins, acrylic copolymer resins containing hydroxymethyl or hydroxypropyl methacrylate, vinyl or acrylic copolymer resins containing glycerol monoallyl ether, trimethylolpropane monoallyl ether, or ethylene glycol monoallyl ether; and allyl alcohol copolymer resins.

In addition, the alkoxyalkolated polymer resins of Formula II may be crosslinked by treatment with resins containing reactive epoxy groups of the formula

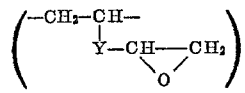

to yield polymers of the Formula VI, wherein R, R', R'', X, Y, n and m are as above defined:

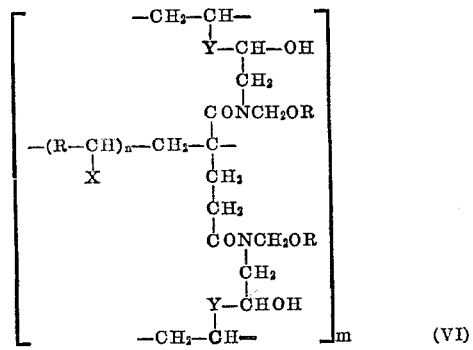 (VI)

The polymeric resins containing reactive epoxy groups which may be employed include such resins as epoxy resins, vinyl copolymeric resins containing allyl glycidyl ether or glycidyl acrylate or methacrylate.

Furthermore, the alkoxyalkylolated polymer resins of Formula II may be crosslinked by treatment with a polymeric resin containing reactive N-alkoxyalkyl, e.g., N-alkoxymethyl or N-methylol groups of the formula:

$(>N—CH_2 OZ)$ to yield crosslinked polymer resins of the Formula VII wherein, Z is hydrogen or alkyl, and R, R', R'', X, n, and m are as above defined:

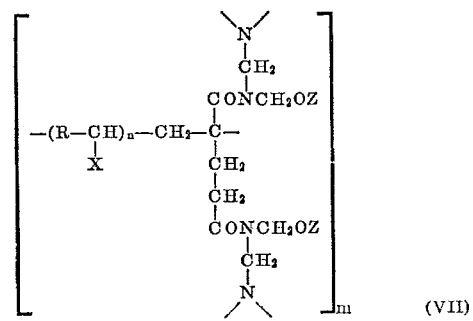 (VII)

The polymeric resins containing reactive N-alkoxyalkyl, for example N-alkoxymethyl, or N-methylol groups, which may be employed include such polymeric resins as urea-formaldehyde resin, melamine-formaldehyde resin, triazine-formaldehyde resin, and hydroxymethylacrylamide copolymer resins, as well as non-polymeric materials such as hexa-kis-methoxymethyl or hexa-kis-hydroxymethyl melamine.

The amounts of reactants and conditions of reaction to be employed in the crosslinking processes described above to produce the novel crosslinked polymeric resins of Formulae III, IV, V, VI, and VII, may be varied depending upon the properties and characteristics desired in the final products. However, generally it has been found that outstanding results are obtained when the respective reactants resins are employed in amounts of from about one-nineteenth to about nineteen times by weight of the alkoxyalkylolated polymers of Formula II, although other ratios may also give satisfactory results.

The crosslinked polymers thus derived from the further treatment of the novel alkoxyalkylolated polymers may be further treated to yield additional products of desired properties. These products may then be employed in the preparation of a wide variety of compositions useful in the surface coating art. It should be obvious from the foregoing, that the multitude of possible crosslinked polymeric derivatives obtainable as set forth above, provides sufficient latitude for preparing a variety of compositions therefrom. It should also be apparent that these derivatives may be employed in the production of surface coating compositions, for example, baking enamel compositions, by the addition and/or incorporation of pigments, catalytic agents, for examples, acidic catalysts, conventional solvents such as aromatic hydrocarbons and alcohols and the usual formulating components, for example leveling agents and viscosity modifiers. Recently, the commercial applications of such resins have increased and are especially in wide demand for use in automotive and appliance surface coating compositions. More particularly, it has been found that surface coating compositions prepared in accordance with this invention possess very desirable qualities such as hardness, flexability, stain resistance, impact resistance as well as detergent resistance.

The invention will be more fully understood by reference to the following illustrative embodiments.

EXAMPLE 1

α-Methyleneglutaramide 182 g. of α-methyleneglutaronitrile were added slowly over a two hour period to a stirred, cooled solution of 400 g. of 84.5% sulfuric acid. The temperature was maintained between 54 to 57° C. by cooling with a bath. After complete addition, the mixture was heated at 66° C. for 15 minutes, then cooled to 30° C. and poured into a stirred solution of two liters of isopropanol. Anhydrous ammonia was then bubbled into the alcohol solution with the formation of a white precipitate. During the neutralization with ammonia, the temperature of the mixture was maintained below 30° C. by means of an ice bath. When neutral to a test paper (pH 7.0 on Hydrion paper) the mixture was filtered from the ammonium sulfate and the alcohol concentrated by distillation. The amide came out on cooling and was filtered and washed yielding a product having a melting point of 164–165° C.

EXAMPLE 2

α-Methyleneglutaramide copolymer resin I

A 3-necked flask equipped with a thermometer, a water cooled reflux condenser and agitator was charged with 59.5 g. α-methyleneglutaramide, 400 g. of butanol and 28 g. distilled water. The flask was heated at 96° C. (reflux) for about 2 hours in order to dissolve the α-methyleneglutaramide completely in butanol-water system. Then 80.5 g. styrene, 89.0 g. ethyl acrylate, 2.0 g. cumene hydroperoxide and 2.0 g. of tert-dodecyl mercaptan were added to the flask and the reaction mixture was refluxed at 96° C. for 2 hours. At this time, 1.0 g. of cumene hydroperoxide was added and reflux was continued for 2 hours. A third portion of 1.0 g. cumene hydroperoxide was then added and reflux was continued for two hours. The reaction mixture was cooled, and the non-volatile content was found to be 36.18% (theory 34.8%) yielding the desired polymeric product.

EXAMPLE 3

Following the procedure set forth in Example 2 but substituting 18.5 g. of α-methyleneglutaramide as the starting material, and α-methyleneglutaramide copolymer I is obtained.

EXAMPLE 4

Following the procedures set forth in Example 2, but substituting 26.6 g. of α-methyleneglutaramide as the starting material, and α-methyleneglutaramide copolymer resin I is obtained.

EXAMPLE 5

Alkoxymethylolated methyleneglutaramide polymer II

The α-methyleneglutaramide copolymer resin prepared in Example 2, was admixed with 126 g. butylformcel and 0.8 g. of maleic anhydride. The reaction mixture was then refluxed for 3 hours at 97° C. to effect condensation. The reaction mixture was distilled to remove about 300 g. of butanol-water mixture and 54 g. of toluene was added to give 50.22% non-volatile content, yielding the polymer of Formula II.

Similarly, following the procedure of Example 5, but substituting equivalent amounts of the copolymers prepared in accordance with the procedures set forth in Examples 3 and 4, alkoxymethylolated methyleneglutaramide polymers II are produced.

EXAMPLE 6

Alkyd resins

An alkyd resin is prepared according to U.S. Patent 3,062,776.

A 3-necked flask equipped with thermometer, stirrer and air-cooled condenser was charged with 149.5 g. isophthalic acid, 52.0 g. fumaric acid, 144.0 g. nonanoic acid, 84.25 g. 2,2-dimethyl-1,3-propanediol and 120.5 g. of 1,2,6-hexanetriol. The reaction mixture was heated under nitrogen to 165°–170° C. for about one hour and the temperature was then raised to 235°–240° C. over 3 hours and was held at that temperature until the reaction mixture was clear. The reaction mixture was then cooled to 170° C. and 28 g. of xylene were added with stirring. The non-volatile content was found to be 64.68% yielding the desired product.

EXAMPLE 7

Acrylic copolymer with reactive carboxylic acid groups

A 3-necked flask equipped with stirrer, condenser and thermometer was charged with 45.0 g. of ethylacrylate, 45.0 g. styrene, 10.0 g. methacrylic acid, 100.0 g. butanol, 1.0 g. cumene hydroperoxide and 1.0 g. tert-dodecylmercaptan. The resulting reaction mixture was heated to reflux temperature (118° C.). After 2 hours of reflux, the temperature rose to 120° C. An additional 0.5 g. of cumene hydroperoxide was added and reflux continued for 2 hours. A third 0.5 g. portion of cumene hydroperoxide was then added and reflux continued for two hours. The non-volatile content was found to be 48.80% (theory 50%).

EXAMPLE 8

Epoxy modified alkoxymethylolated methyleneglutaramide polymer resin IV

An epoxy resin solution comprised of 60% of condensation products of epichlorohydrin and Bisphenol-A (available under the tradename Epon 1001) 25% xylene, and 15% methyl isobutyl ketone is prepared according to well known procedures. Epoxy modified polymer resin compositions were then prepared from the following components in accordance with procedures well known in the art.

| Component | Modified resin A, amount (g.) | Modified resin B, amount (g.) |
|---|---|---|
| α-Methyleneglutaramide resin of example 2 | 16.20 | |
| α-Methyleneglutaramide resin of example 4 | | 16.20 |
| Epoxy resin solution | 1.30 | 1.30 |
| Cellosolve acetate | 0.50 | 0.50 |
| Phosphoric acid solution (8.5% acid in butanol) | 0.45 | 0.45 |

EXAMPLE 9

Modified α-methyleneglutaramide polymer resins II

A solution of copolymerized vinyl chloride and vinyl acetate (25% solids in 1/1 isophorone and methyl isobutyl ketone) sold under the trade name Vinylite VMCH was employed to prepare the following composition.

Component: Modified resin C, amount (g.)
- α-Methyleneglutaramide resin of Example 2 — 10.85
- VMCH modifier — 9.32
- Xylene — 0.38

EXAMPLE 10

N-alkoxymethyl modified α-methyleneglutaramide polymer resins VI

N-alkoxymethyl modified α-methyleneglutaramide polymers of Formula II are prepared from the following components:

| Component | Modified resin D, amount (g.) | Modified resin E, amount (g.) | Modified resin F, amount (g.) |
|---|---|---|---|
| α-Methyleneglutaramide resin of example 2 | 16.20 | | |
| α-Methyleneglutaramide resin of example 4 | | 16.20 | |
| α-Methyleneglutaramide resin of example 3 | | | 16.20 |
| Hexamethoxymethylmelamine | 1.30 | 1.30 | 1.30 |
| Cellosolve acetate | 0.50 | 0.50 | 0.50 |
| Phosphoric acid solution (8.5% acid in butanol) | 0.45 | 0.45 | 0.45 |

The procedure of Example 10 was followed but substituting an equivalent amount of triazine formaldehyde resin (sold under the trade name Uformite MX-61, by Rohm & Hass Co.) for the hexamethoxymethylmelamine to yield Modified Resin Composition F of the Formula IV.

EXAMPLE 11

Alkyd resin modified α-methyleneglutaramide polymer resins III

Modified α-methylengluaramide polymers of the Formula II are prepared from the following components:

| Component | Modified resin G | Modified resin H |
|---|---|---|
| α-Methyleneglutaramide resin of example 2 | 16.20 | |
| α-Methyleneglutaramide resin of example 4 | | 16.20 |
| Alkyd resin of example 6 | 2.30 | 2.30 |
| Cellosolve acetate | 0.50 | 0.50 |
| Phosphoric acid solution (8.5% acid in butanol) | 0.45 | 0.45 |

EXAMPLE 12

Epoxidized linseed oil modified α-methyleneglutaramide polymer resins

An epoxidized linseed oil solution was prepared comprising 60% epoxidized linseed oil, 25% xylene and 15% methyl isobutyl ketone, and a modified α-methyleneglutaramide polymer resin is then prepared from the following components.

Component: Modified resin I, amount (g.)
- α-methyleneglutaramide resin of Example 2 — 16.20
- Epoxidized linseed oil solution — 1.30
- Cellosolve acetate — 0.50
- Phosphoric acid solution — 0.45

EXAMPLE 13

Carboxyl modified α-methyleneglutaramide polmer resin composition

Carboxyl modified α-methyleneglutaramide polymers III were prepared from the following components:

| Component | Modified resin J, amount (g.) | Modified resin K, amount (g.) |
|---|---|---|
| α-Methyleneglutaramide resin of example 2 | 16.20 | |
| α-Methyleneglutaramide resin of example 4 | | 16.20 |
| Carboxyl acrylic polymer of example 7 | 1.30 | 1.30 |
| Cellosolve acetate | 0.50 | 0.50 |

EXAMPLE 14

Preparation of modified α-methyleneglutaramide polymer resin coatings

Surface coatings from the modified α-methyleneglutaramide resin compositions obtained in Examples 8 through 13 were prepared.

Bonderite steel panels were immersed in chloroform for 24 hours before the coatings were applied. A 3 mil. thick wet film was drawn down on the Bonderite panels using a Gardner film applicator. The coatings were cured using the curing cycle of first heating at 60° C. for 30 minutes and then baking at 150° for 30 minutes.

In addition various other ingredients may be incorporated into the coating compositions for aesthetic or other purposes, i.e., coloring, sheen, and the like, as may be desired.

What is claimed is:

1. An organic polymer comprised of a plurality of repeating chemical units of the formula:

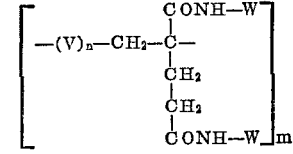

wherein W is selected from the group consisting of hydrogen and R''—O—R', wherein R'' is lower alkylene and R' is lower alkyl; V is a member of the group represented by the formula

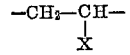

wherein X is selected from the group consisting of phenyl and —COOR'''— wherein R''' is selected from the group consisting of hydrogen and lower alkyl; $n$ is a positive integer greater than zero and less than 75; and $m$ is a positive integer greater than zero and less than 50.

2. The polymer of claim 1 wherein each W is hydrogen.

3. The polymer of claim 1 wherein R'' is methylene and R' is lower alkyl of less than six carbon atoms.

4. The process of producing a crosslinked polymer which comprises reacting at elevated temperatures a polymer comprised of a plurality of repeating chemical units of the formula:

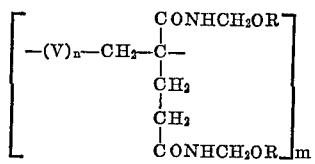

wherein R is lower alkyl and V, $n$ and $m$ are as defined in claim 1; with polymers having reactive hydroxyl groups; polymers having reactive carboxyl groups; polymers having reactive epoxy groups; polymers having reactive N-alkoxyalkyl groups; polymers having reactive N-methylol groups to yield the desired polymeric resin groups; urea; or poly(hydroxylmethyl) melamine.

5. An organic polymer comprised of plurality of repeating chemical units of the formula:

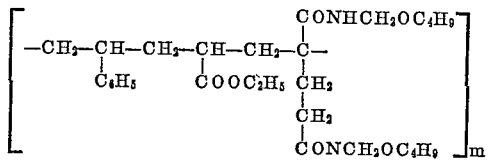

wherein $m$ is an integer from 1 to 49.

6. An organic polymer comprised of a plurality of repeating chemical units of the formula:

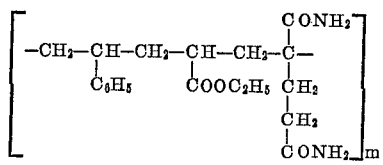

wherein $m$ is an integer from 1 to 49.

References Cited

UNITED STATES PATENTS 3,098,867 7/1963 Marvel _____ 260—78
3,225,083 12/1965 McClure _____ 260—465.8
3,350,439 10/1967 Feldman _____ 260—465.5

SAMUEL H. BLECH, *Primary Examiner.*

PAUL LIEBERMAN, *Assistant Examiner.*

U.S. Cl. X.R.

260—72, 851, 873, 89.7, 78.4, 78.5, 78, 23, 561, 837, 898, 901, 874, 33.6, 33.4, 465.8, 557; 117—132